United States Patent
Yang et al.

(10) Patent No.: US 9,201,953 B2
(45) Date of Patent: Dec. 1, 2015

(54) FILTERING INFORMATION USING TARGETED FILTERING SCHEMES

(71) Applicant: Alibaba Group Holding Limited, Grand Cayman (KY)

(72) Inventors: Junjie Yang, Hangzhou (CN); Liang Ni, Hangzhou (CN); Zhenghua Zhang, Hangzhou (CN); Zhenyu Zhang, Hangzhou (CN)

(73) Assignee: Alibaba Group Holding Limited, Grand Cayman, KY (US)

( * ) Notice: Subject to any disclaimer, the term of this patent is extended or adjusted under 35 U.S.C. 154(b) by 0 days.

(21) Appl. No.: 14/197,118

(22) Filed: Mar. 4, 2014

(65) Prior Publication Data

US 2014/0188913 A1 Jul. 3, 2014

Related U.S. Application Data

(63) Continuation of application No. 12/667,145, filed as application No. PCT/US2009/048817 on Jun. 26, 2009, now Pat. No. 8,725,746.

(30) Foreign Application Priority Data

Jun. 26, 2008 (CN) .......................... 2008 1 0126362

(51) Int. Cl.
*G06F 17/30* (2006.01)
*G06F 21/55* (2013.01)
(Continued)

(52) U.S. Cl.
CPC .... *G06F 17/30702* (2013.01); *G06F 17/30867* (2013.01); *G06F 21/55* (2013.01);
(Continued)

(58) Field of Classification Search
CPC .................................................. G06F 17/30867
USPC .......................................................... 707/754
See application file for complete search history.

(56) References Cited

U.S. PATENT DOCUMENTS 7,113,977 B1 9/2006 Baker et al.
7,260,837 B2 8/2007 Abraham et al.
(Continued)

FOREIGN PATENT DOCUMENTS

JP 2002024274 A 1/2002
JP 2003067304 A 3/2003
JP 2005332048 A 12/2005

OTHER PUBLICATIONS

The Chinese Office Action mailed May 18, 2012, for Chinese patent application No. 200810126362.X,a counterpart foreign application of U.S. Appl. No. 12/667,145, 8 pages.
(Continued)

*Primary Examiner* — Grace Park
(74) *Attorney, Agent, or Firm* — Lee & Hayes, PLLC

(57) ABSTRACT

A method for filtering user information takes into account not only specific keywords in the user information, but also related user-characteristic data (e.g., user activity data), and allows targeted user characteristics to be determined from multiple aspects of user activities. In one aspect, the disclosed method adopts different filtering schemes for different types of targeted users to improve the recognition accuracy with respect to the target user information. The method determines a suitable filtering scheme using a correspondence relationship between the filtering scheme and keywords and user-characteristic data. The method uses modeling of sample users and multiple candidate filtering schemes to formulate targeted filtering scheme. An apparatus for implementing the method is also disclosed.

20 Claims, 4 Drawing Sheets

(51) Int. Cl.
    *H04L 12/58*     (2006.01)
    *H04L 29/06*     (2006.01)
    *G06Q 30/02*     (2012.01)

(52) U.S. Cl.
    CPC ............ *G06Q 30/02* (2013.01); *H04L 12/581* (2013.01); *H04L 12/585* (2013.01); *H04L 51/04* (2013.01); *H04L 51/12* (2013.01); *H04L 63/0245* (2013.01)

(56) References Cited

U.S. PATENT DOCUMENTS

| | | | |
|---|---|---|---|
| 7,320,020 | B2 | 1/2008 | Chadwick et al. |
| 7,558,832 | B2 | 7/2009 | Rounthwaite et al. |
| 7,831,464 | B1 | 11/2010 | Nichols et al. |
| 2005/0171955 | A1 | 8/2005 | Hull et al. |
| 2005/0198159 | A1 | 9/2005 | Kirsch |
| 2007/0156677 | A1 | 7/2007 | Szabo |
| 2007/0156886 | A1 | 7/2007 | Srivastava |
| 2007/0219979 | A1 * | 9/2007 | Jung et al. ............ 707/5 |
| 2007/0282770 | A1 | 12/2007 | Choi |
| 2008/0140781 | A1 | 6/2008 | Bocharov et al. |
| 2009/0089279 | A1 | 4/2009 | Jeong et al. |
| 2009/0144276 | A1 | 6/2009 | Russell et al. |
| 2009/0149203 | A1 | 6/2009 | Backholm et al. |
| 2009/0150365 | A1 | 6/2009 | Chow et al. |
| 2009/0187988 | A1 | 7/2009 | Hulten et al. |
| 2009/0222557 | A1 | 9/2009 | Rudy et al. |
| 2011/0010374 | A1 | 1/2011 | Yang et al. |

OTHER PUBLICATIONS

The Extended European Search Report mailed Aug. 26, 2013 for European patent application No. 09771124.6, 5 pages.
Hershkop et al., "Combining Email Models for False Positive Reduction," KDD'05, ACM, Aug. 21-24, 2005, Chicago, Illinois, pp. 98-107.
Nakamichi, "Basis is Filtering; Expectation is Sender Authentication; Countermeasure Against Spam/Phishing," Nikkei Byte, No. 259, pp. 92-100, Nikkei Business Publications, Inc., Japan, Nov. 22, 2004.
Non-Final Office Action for U.S. Appl. No. 12/667,145, mailed on Mar. 1, 2012, Junjie Yang et al., "Filtering Information Using Targeted Filtering Schemes," 16 pages.
Final Office Action for U.S. Appl. No. 12/667,145, mailed on Jul. 19, 2012, Junjie Yang et al., "Filtering Information Using Targeted Filtering Schemes," 15 pages.
Ramachandran et al., "Filtering Spam with Behavioral Blacklisting," CCS'07, ACM, Oct. 29-Nov. 2, 2007, Alexandria, Virginia, pp. 342-351.
Shapira et al., "Experimentation with an Information Filtering System that Combines Cognitive and Sociological Filtering Integrated With User Stereotypes," Decision Support Systems 27, 1999, pp. 5-24.

* cited by examiner

FILTERING INFORMATION USING TARGETED FILTERING SCHEMES

RELATED APPLICATIONS

This application is a continuation of and claims priority to U.S. patent application Ser. No. 12/667,145, filed on Dec. 29, 2009, which is a national stage application of international patent application PCT/US09/48817 filed Jun. 26, 2009, entitled "FILTERING INFORMATION USING TARGETED FILTERING SCHEMES" which claims priority from Chinese patent application, Application No. 200810126362.X, filed Jun. 26, 2008, entitled "METHOD AND APPARATUS FOR FILTERING USER INFORMATION", which applications are hereby incorporated in their entirety by reference.

TECHNICAL FIELD

The present disclosure relates to fields of information security technologies, and particularly to methods, and apparatuses for filtering user information.

BACKGROUND

The developments of digital technologies have resulted in tremendous amount of data generated everywhere. The daily large volume transaction data of a bank is but one example. Data processing to obtain beneficial information has been a rewarding experience. Rapid development of computer technology has opened up a variety of possibilities for data processing, and promoted great leaps in the development of database technology. Faced with the ever increasing data volume, however, people are becoming increasingly dissatisfied with query function of a database. One basic question has emerged: Can we obtain from the data real information or knowledge that is actually useful for decision making? The conventional database technology, which is only good at data management, has become powerless in face of this basic question, and so is conventional statistical technology which faces its own great challenges. Therefore, a new method for processing massive amount of data is urgently needed.

At the same time, methods for promulgating information by users through the Internet have become more and more effective and comprehensive. Examples of methods for promulgating information include using instant messaging tools, sending various kinds of information by email, or posting information on a forum on a network. However, part of this circulated information may be undesirable to a user, or information may be illegally promulgated and need to be filtered. Existing methods for filtering user information are based on direct keyword determination. If a relevant keyword appears in user information, associated user is determined to be a target user.

However, existing technical scheme only matches information using keywords and does not penalize the information or user characteristics from other aspects, and therefore may incur a high false-alarm rate. For example, if "win a prize" is used as a keyword to future fake prize-winning advertisements, and if something like "I won a prize today" appears in a message of a user, a system may falsely conclude that what the user is sending is a fake prize-winning advertisement, and therefore filter out the message of the user to cause the user to fail to perform related normal operations such as chatting and leaving comments.

SUMMARY

The present disclosure provides a method and an apparatus for filtering user information. The method takes into account not only specific keywords in the user information, but also related user-characteristic data (e.g., user activity data), and allows determining targeted user characteristics from multiple aspects of user activities. The disclosed method adopts different filtering schemes for different types of targeted users to improve the recognition accuracy with respect to the target user information. The method determines a suitable filtering scheme using a correspondence relationship between the filtering scheme and keywords and user-characteristic data. The method uses modeling of one or more sample users and multiple candidate filtering schemes to formulate targeted filtering scheme.

In one embodiment, the method obtains keywords and user-characteristic data of a user, and selects a filtering scheme according to the correspondence relationship between the filtering scheme and the keywords and user-characteristic data. The selected filtering scheme is used to filter the information of the user. The filtering scheme is modeled to filter targeted users whose information has similar keywords and user-characteristic data.

The correspondence relationship between the filtering scheme and the keywords and user-characteristic data may be configured using a pre-stage (e.g., off-line) modeling procedure. In one embodiment, the procedure sets (e.g., extracts and configures) targeted keywords and user-characteristic data from a data collection of targeted users, and generates user-characteristic parameters of a target user based on the targeted keywords and user-characteristic data. After filtering out anomalies in the user-characteristic parameters, the procedure formulates the filtering scheme based on the filtered user-characteristic parameters, and established a correspondence relationship between the filtering scheme and the targeted keywords and user-characteristic data.

To generate user-characteristic parameters of the target user, the method identifies valid data in the set keywords and user-characteristic data, selects one or more sample users based on the valid data, and obtains the user-characteristic parameters of the target user based on the keywords and user-characteristic data of the one or more sample users.

The user-characteristic parameters of the target user may be obtained by generating useful variables such as aggregated variables, ratio variables and average variables. An aggregated variable of the target user is generated based on a total frequency according to the keywords and user-characteristic data of the one or more sample users. A ratio variable of the target user is generated based on a send/receive ratio according to the user-characteristic data of the one or more sample users. An average variable is generated based on an average frequency according to the keywords and user-characteristic data of the one or more sample users.

The filtering scheme is modeled to filter targeted users using a pre-stage (e.g., off-line) procedure. In one embodiment, this procedure sets keywords and user-characteristic data from a data collection of targeted users, and generates user-characteristic parameters of a target user based on the extracted keywords and user-characteristic data. The procedure then selects one or more rule generation parameters from the user-characteristic parameters, and generates multiple filtering schemes based on the rule generation parameter. The procedure selects the filtering scheme having the highest accuracy among the multiple filtering schemes to be the filtering scheme for the target user.

In an exemplary implementation, the method scores a user based on the selected filtering scheme. The information of the user is filtered according to the filtering scheme only if the user's exceeds a preset threshold.

The user-characteristic data may include user activity data, user information data and network user-characteristic data.

Another aspect of the disclosure is an apparatus for filtering user information. The apparatus has a configuration module, an acquisition module and a filter module. The configuration module is used for configuring a correspondence relationship between a targeted filtering scheme and targeted keywords and user-characteristic data from a data collection of targeted users. The acquisition module is used for acquiring keywords and user-characteristic data of a present user. The filtering module is used for selecting the targeted filtering scheme according to the correspondence relationship based on the acquired keywords and user-characteristic data of the present user, and for filtering information of the present user according to the targeted filtering scheme.

The configuration module may also be adapted to perform a pre-stage (e.g., off-line) modeling process to generate the targeted filtering scheme for the target user based on the filtered user-characteristic parameters.

The disclosed apparatus may employ a server computer to perform both the modeling and the filtering.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures. In the figures, the use of the same reference numbers in different figures indicates similar or identical items.

DETAILED DESCRIPTION

The present disclosure provides a method and an apparatus for filtering user information. The method takes into account not only specific keywords in the user information, but also other user-related information. Using the filtering techniques disclosed herein, the method and apparatus allow determining the characteristics of a target user (e.g., a user who spreads information that is unwanted by others, or a user who illegally promulgates information) from multiple aspects of user activities, and process the target user accordingly to improve the recognition accuracy with respect to the target user, and to strengthen the information security.

Figure 1:
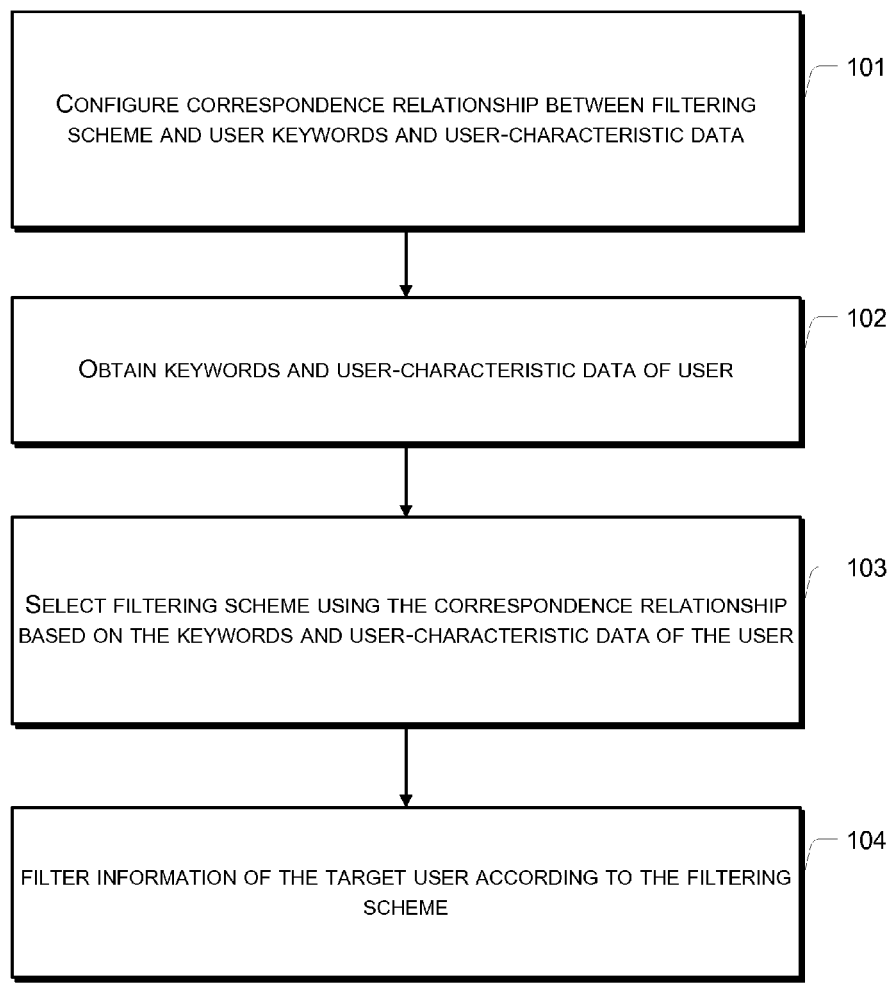
FIG. 1 shows a flow chart of an exemplary method for filtering user information in accordance with the present disclosure.

FIG. 1 shows a flow chart of an exemplary method 100 for filtering user information in accordance with the present disclosure. In this description, the order in which a process is described is not intended to be construed as a limitation, and any the number of the described process blocks may be combined in any order to implement the method, or an alternate method. As shown in FIG. 1, the exemplary method 100 includes a procedure described as follows.

Block 101 configures a correspondence relationship between a filtering scheme and user keywords and user-characteristic data. This stage is the preparation stage for filtering user information. Various filtering schemes may be designed to target various types of targeted users. For example, one filtering scheme may be used to target users who circulate pornographic information, and another filtering scheme may be used to target users who send out spam information containing unsolicited advertisements. During the preparation stage represented by block 101, a correspondence relationship is built between filtering schemes and various types of user keywords and user-characteristic data, such that a suitable filtering scheme can be selected according to the keywords and user-characteristic data of an actual user. As will be described in further detail herein, the preparation stage is a pre-stage which can be performed separately from the actual filtering application. Such pre-stage may even be done off-line using a data collection of the information of targeted users.

In the present disclosure, a filtering scheme may be defined by various variables (e.g., a key word, a type of keywords, frequency, etc.) and their threshold values. Filtering schemes may differ from one another in various ways and different degrees. For example, filtering schemes targeting different types of users may be different from each other in the different variables which define the filtering schemes. In comparison, filtering schemes targeting the same type of users may have the same or similar variables but different threshold values provide different emphasis flavors (or different effectiveness) of filtration.

One exemplary filtering scheme performs filtering based on frequencies of one or more keywords. For example, if a keyword A appears N (N≥1) times, associated user information is then filtered. A correspondence relationship may be established between this exemplary filtering scheme and the keyword and its filtering requirement (i.e., frequency of the keyword).

Block 102 obtains keywords and user-characteristic data of a user. This is the beginning of the actual filtration stage. The system analyzes the information of the present user in order to decide whether the information of the user needs to be filtered, and if yes, which filtering scheme should be used.

Block 103 selects the filtering scheme using the correspondence relationship based on the keywords and user-characteristic data of the user. The correspondence relationship is configured at block 101. The system compares the keywords and user-characteristic data of the present user with the keywords and the user-characteristic data that corresponds to each available filtering scheme and decides which one is suitable for the present user. In general, the closer match indicates a more suitable filtering scheme. Block 104 filters information of the target user according to the selected filtering scheme.

The filtering scheme and its correspondence relationship with the keywords and user-characteristic data are configured using a pre-stage modeling process represented by block 101. Detail of this modeling process will be described further below.

Figure 2:
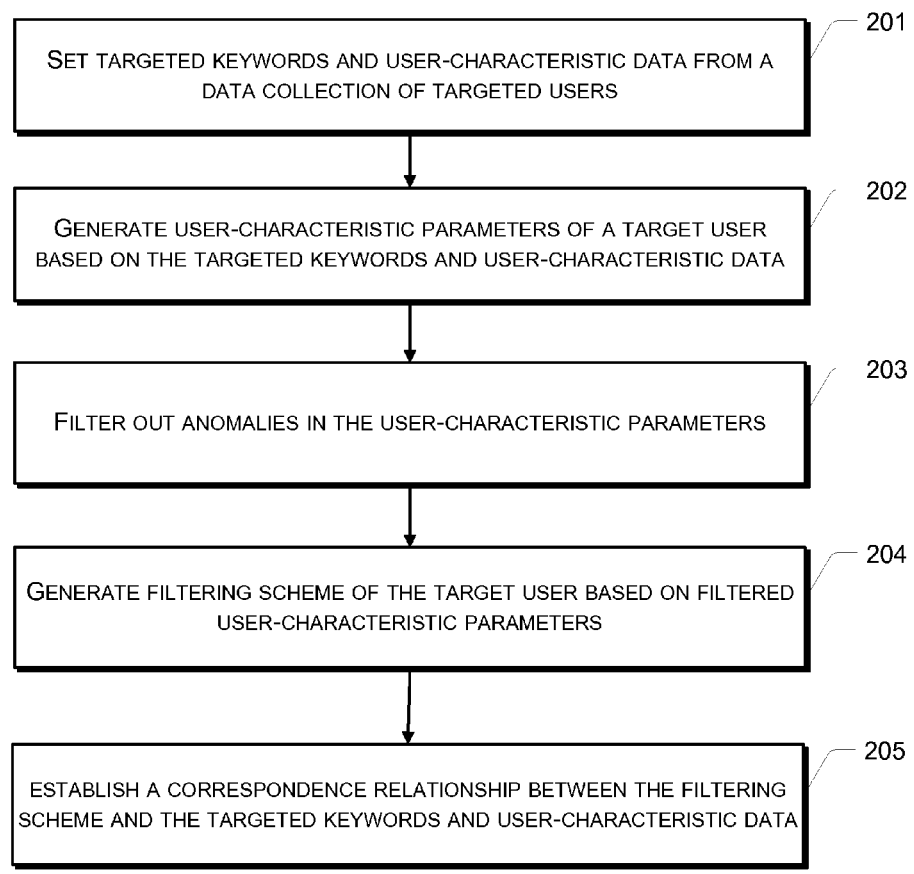
FIG. 2 shows a flow chart illustrating an exemplary process for configuring a correspondence relationship among keywords, user-characteristic data and the scheme for filtering target user information in accordance with the present disclosure.

An exemplary procedure for Block 101 includes a process illustrated in FIG. 2. FIG. 2 shows a flow chart illustrating an exemplary process 200 for configuring a correspondence relationship among keywords, user-characteristic data and the scheme for filtering target user information in accordance with the present disclosure.

Block 201 sets targeted keywords user-characteristic data from a data collection of targeted users. This may involve extracting and configuring target keywords and user-characteristic data from the data collection of targeted users. The user-characteristic data may include various types of data such as user activity data, user information data, and network user-characteristic data, as described as follows.

The user activity data includes one or more types of information including frequencies of characteristic word groups in the information sent by the user within a time frame, the number of times the user sends/receives information, and the amount of information the user sends/receives.

The user information data includes one or more types of information including initial login time of the user, user activities after login, and the number of contacts of the user.

The network user-characteristic data includes one or more types of information including the number of user IDs within the same IP, and the number of user IDs within the same machine ID.

Block 202 generates user-characteristic parameters of a target user based on the user-characteristic data. During the modeling stage, a target user does not have to be a specific user. Instead, a target user may be an abstract user representing a type of targeted users such as those who circulate pornographic information. An exemplary process for generating such user-characteristic parameters is described as follows.

Valid data in the user-characteristic data are first identified. Specifically, upon obtaining enough data, data cleaning is required to eliminate some fields or records. For example, certain data contents are configured to be essential while other data contents are set to be non-essential according to user requirements. The non-essential data contents can be then eliminated, leaving only data contents that are essential.

Based on the above-identified valid data, one or more sample users are selected from the available targeted users for modeling. The information records in the data selection are sampled to determine a target user which is used for building a rule model. The information records may include messages sent or promulgated by the targeted users.

User-characteristic parameters of the target user are obtained based on user-characteristic data of the sample users. The user-characteristic parameters are characteristic properties of the target user. The user-characteristic parameters are defined by straight variables (such as the frequency of the keyword) and derived variables. According to the modeling objective, derived variables are obtained using existing data in order to better understand activities of a user with a more comprehensive perspective. The derived variables are acquired based on performing combinational computation on multiple user-characteristic data.

Different kinds of derived variables may be designed and computed from the user-characteristic data. Several examples are described below.

(1) Compute the total frequency of the user-characteristic data, and generate an aggregated variable of the target user. An aggregated variable is a statistical result of all user-characteristic data.

(2) Compute a send/receive ratio of the information having the user-characteristic data, and create a ratio variable of the target user. The ratio variable embodies a proportional relationship of different statuses of the user-characteristic data of the target user.

(3) Compute an average frequency of the user-characteristic data, and create an average variable of the target user. The Average variable embodies an average frequency of the user-characteristic data of the target user within a unit time.

In the above, the computation may use the user-characteristic data of the selected sample users only.

Block 203 filters anomalies (e.g., anomalous values) in the user-characteristic parameters.

An exemplary filtering process used here searches for variables that need to be eliminated and missing values that need to be replaced are searched for. Specifically, the filtering process replaces any missing value in the user-characteristic parameters by a replacement value. To do this, a replacement rule for data's missing value is set. For example, a rule may be set to replace all missing values by zeros. The filtering process also replaces an irregular value (a value that does not satisfy a format rule) by a regular value. For example, the filtering process may replace traditional characters by corresponding simplified characters, uppercases by lowercases, and SBC cases by DBC cases, etc., in all text information.

Block 204 generates a filtering scheme for the target user based on the filtered user-characteristic parameters. Block 205 establishes a correspondence relationship between the filtering scheme and the targeting keywords and user-characteristic data.

Filtering schemes are generated using a modeling process described herein. Upon obtaining data that satisfy the requirements in the foregoing blocks, the process enters into a modeling stage to generate candidate filtering schemes and select the best performing candidate filtering schemes as targeted filtering schemes. Modeling includes tasks such as selecting a suitable algorithm, selecting suitable parameters, formulating a model verification scheme, formulating a data sampling plan, and configuring model parameters.

An exemplary modeling process selects one or more user-characteristic parameters from the filtered user-characteristic data to be rule generation parameters, and generates multiple filtering schemes by filtering scheme adjustment based on adjusting the rule generation parameters. The process than selects a filtering scheme that has demonstrated the highest accuracy in the testing from multiple filtering schemes to be the filtering scheme of the target user.

Modeling and data preparation may be performed interactively. An initial result of modeling may produce new requirements for data preparation, while a result of data preparation may directly affect model construction.

Pattern rules of the target user are formed using the above process. Furthermore, in a practical application, the system may score a user based on the filtering scheme of the target user. If the score of the user exceeds a preset threshold, information of the user is filtered to monitor and ensure the network security.

The filtering scheme may be applied in information filtering tasks in various interactive networked processes implemented for information communication. Examples of such processes include email, forums, and instant messaging. The scope of the present disclosure covers such applications using the filtering scheme in these processes.

Exemplary implementations of the present disclosure are described in further detail using accompanying figures and exemplary embodiments.

Figure 3:
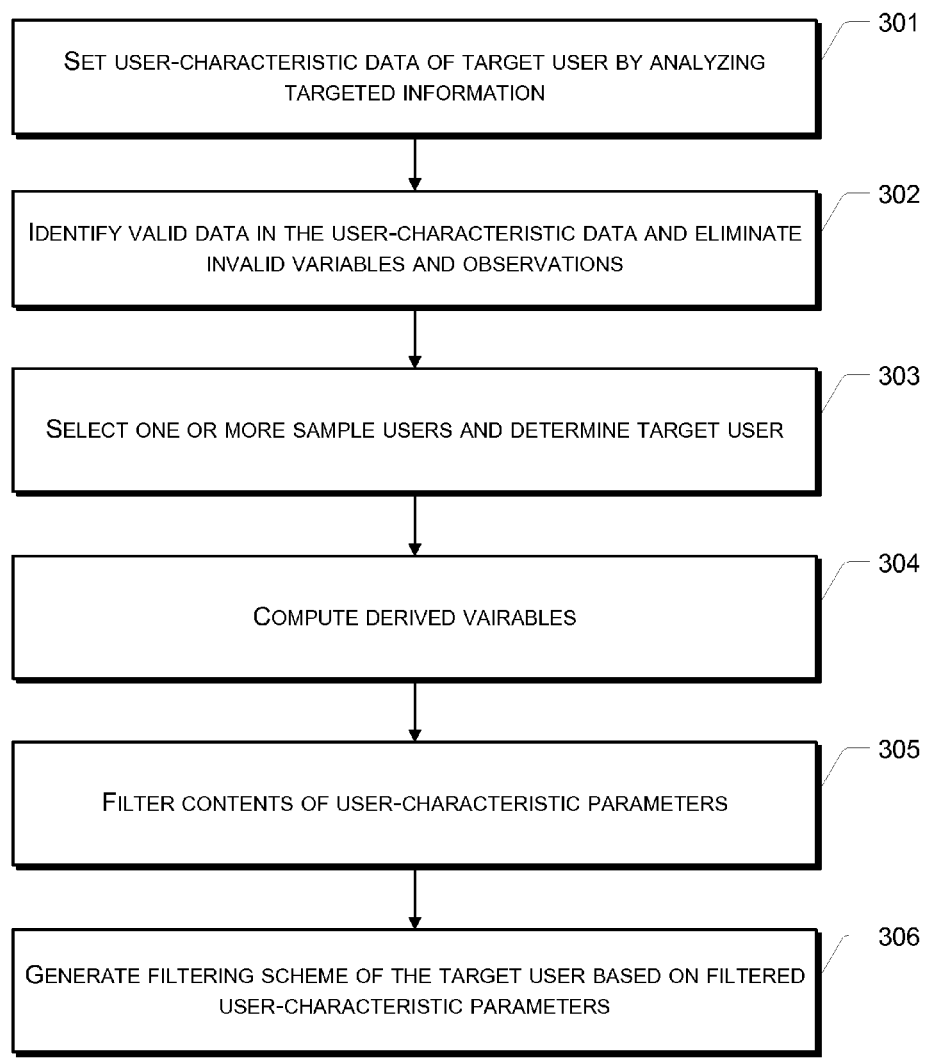
FIG. 3 shows a flow chart of an exemplary method for filtering user information in accordance with the present disclosure.

To illustrate the method for filtering user information, FIG. 3 shows an example process 300 of filtering user information of users who circulate pornographic information. The system analyzes chat messages of these targeted users, and discovers implicit models for the information sent by these targeted users who circulate pornographic information. The models are obtained through data mining modeling. A filtering scheme for a target user who circulates pornographic information is generated using a generating scheme. During the modeling process which generates filtering schemes, the target user is an abstract user representing a certain type of targeted users. The filtering scheme thus generated is then used to monitor the information of this type of users.

The process 300 of FIG. 3 is further described in detail as follows.

Block 301 sets the user-characteristic data of targeted users through analyzing the targeted information. The target information may be a data collection of the targeted users (e.g., messages sent by users who are known to be circulating pornographic information). The user-characteristic data is set by extracting and configuring the targeted information. The user-characteristic data may include user activity data, user information data, and network user-characteristic data. Specific scopes and results of the data setting are described as follows.

1. Setting of the user activity data, including:
   (1) Frequencies of keywords such as catalog, movie, channel, video, animation, cartoon, picture, show, watch, download, online, pornographic, erotic, sexual, passion, adult, ethics, porn star, classics, R-rating, "A" film, uncoded, clear, AV, etc.
   (2) The number of times the user sends information, and the total number of bytes of the sent information.
   (3) The number of times the user receives information, and the total number of bytes of the received information;
   (4) The number of times the user sends information to strangers.

2. Setting of the scopes for user information data, including:
   (1) The time at which the user first logins.
   (2) The activities of the user.
   (3) The number of buddies of the user.

3. Setting of the scopes for network user-characteristic data, including:
   (1) The number of users on the same IP.
   (2) The number of users on the same MAC address.

Upon completing the settings, the user-characteristic parameters of the target user (i.e., a representative user who sends pornographic information in the illustrated example) are generated based on the user-characteristic data that have just been set. The user-characteristic parameters would reflect whether a user is sending pornographic information. The target user required in modeling is found through analysis and screening. An exemplary process is described as follows.

Block 302 identifies the valid data in the user-characteristic data, and eliminates the invalid variables and observations.

For example, data regarding the number of buddies a user has added and the number of times a user has sent information to strangers are unavailable under existing technologies. Therefore, options related to these contents are removed from the setting result of the user-characteristic data.

Block 303 selects one or more sample users, and determines a target object (a target user).

This process sets a user who sends pornographic information as a model object, samples and extracts the communicated information records of this type of users to determine a target user for building the model. Examples of the communicated information records include chat records, message records, and email records.

Block 304 computes derived variables.

Based on the model object, this process computes the derived variables using the above data in order to understand the customer activities of the target user more comprehensively. In the present exemplary embodiment, three primary types of derived variables are used in modeling: aggregated variable, ratio variable, and average variable. These derived variables are described further below.

1. Aggregated Variables

One example of an aggregated variable is the number of targeted keyword types that appear. For example, if information contains keywords "AV", "pornstar", and "R rating", the number of targeted keyword types that appeared is three, and therefore the value of the corresponding aggregated variable data is three.

Another example of an aggregated variable is the number of keyword appearances measured by keyword groups. For example, keywords such as "watch", "download", and "online" are categorized into the same homogeneous group, and the total number of times these keywords appear is computed for the same group.

2. Ratio Variables

One example of a ratio variable is the send/receive ratio, such as a ratio between the number of times information is sent and the number of times information is received, and a ratio between the number of bytes of information sent and the number of bytes of information received. This type of variables may be indicative of a certain type of users who send out large quantities of information but seldom receive information from others.

3. Average Variables

One example of an average variable is the average frequency of a keyword type's appearance. This can be measured by the frequency of a keyword divided by the total frequency of all keywords.

Block 305 filters user-characteristic parameters.

A variable which has a missing value is replaced according to a replacement rule for missing values of data. For example, a missing value is replaced by zero.

For text information, an exemplary data cleaning may be converting all text information from traditional Chinese characters to simplified Chinese character, uppercases to lowercases, and SBC cases to DBC cases.

Block 306 generates a filtering scheme of the target user based on the filtered user-characteristic parameters.

After the user-characteristic parameters have been prepared, the process enters into the modeling stage. Modeling includes such tasks as selecting a suitable algorithm, selecting suitable parameters, formulating a model verification scheme, formulating a data sampling plan, and configuring model parameters.

Modeling and data preparation are interactive processes. An initial result of modeling may produce new requirements for data preparation, while a result of data preparation may directly affect model construction.

Because user-characteristic parameters and modeling algorithms can be varied, multiple rule models may be computed. In order to select the most accurate model among the computed results to be a final filtering scheme of the target user, filtering tests for the models may be performed on model data or training data which contains information of targeted users whose behavior is known. TABLE 1 shows an example of a model prediction result.

TABLE 1

Statistics of model testing result

|  | Predict: False | Predict: True |
|---|---|---|
| Actual: False | 896 | 87 |
| Actual: True | 173 | 423 |

Based on data in TABLE 1, the accuracy of associated model is computed as follows:
(Predicted True and Actual True+Predicted False and Actual False)/The total number of samples=(423+896)/(896+423+87+173)=83.5%

Based on the above computed result, determination is made whether the model satisfies an accuracy requirement. From all models that have satisfied the accuracy requirement, one or more models having the highest accuracy are selected to be the filtering scheme(s) for the target user. That is, the selected the filtering scheme(s) is to be used for filtering users who promulgates pornographic information.

The disclosed method achieves time-division monitoring and collecting of the records of the communicated information. The data mining and modeling may be a pre-stage preparation carried out at the backend. This may even be done off-line. In application, the system uses the targeted filtering scheme generated by the modeling to give each user a score. If a user's score exceeds a preset threshold, the system concludes that the user is promulgating pornographic information, and therefore applies the filtering scheme to filter the information of the user. The system may apply other relevant controlling measures to penalize the user accordingly. For instance, the system may enlist the user into a monitoring system. A supervising network security officer may then determine, from a business point of view, whether the user who has been enlisted into the monitoring system has met the penalty requirements, and penalize the user if the user needs the penalty requirements.

Figure 4:
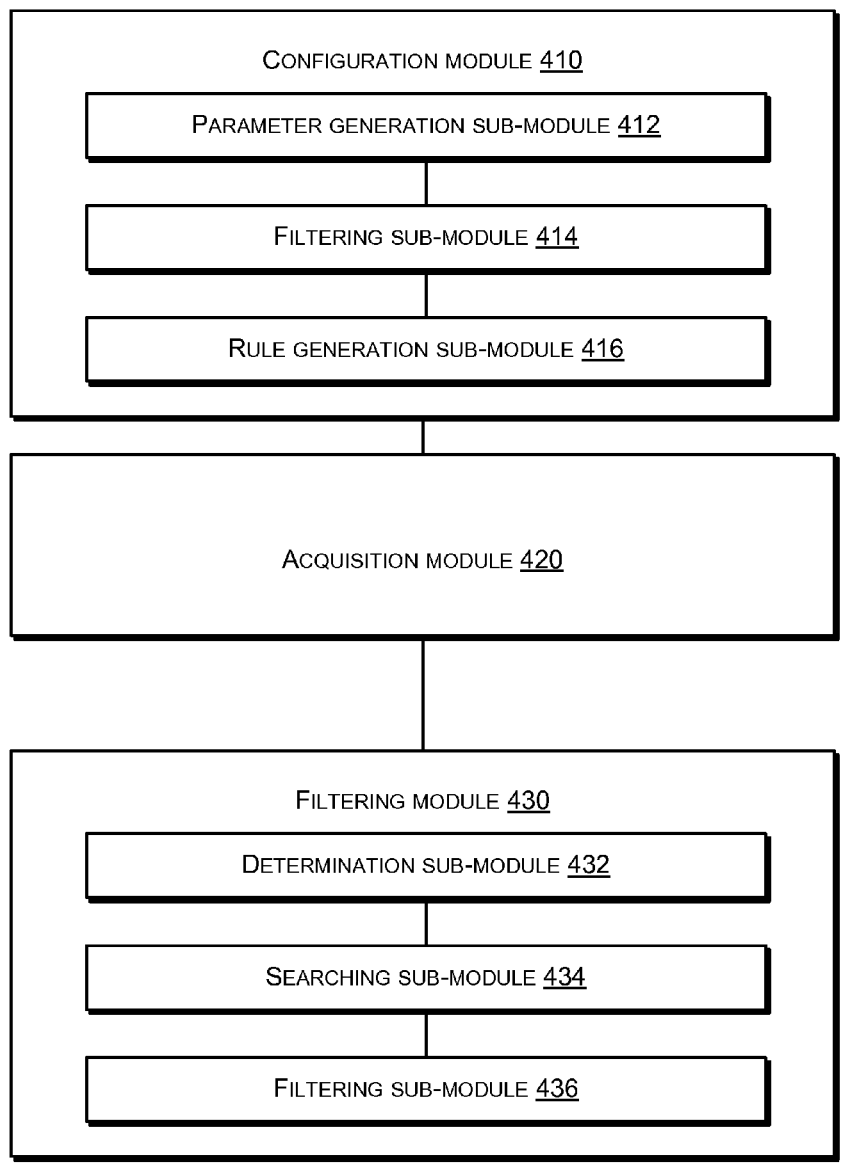
FIG. 4 shows a structural diagram of an exemplary apparatus for filtering user information in accordance with the present disclosure.

FIG. 4 shows a structural diagram of an exemplary apparatus 400 for filtering user information in accordance with the present disclosure. Information filtering apparatus 400 includes a configuration module 410, acquisition module 420 and a filtering module 430.

The configuration module 410 is used for configuring a correspondence relationship between a filtering scheme and the keywords and user-characteristic data of targeted users. The acquisition module 420 is used for acquiring keywords and user-characteristic data of a present user. The filtering module 430 is used for finding and selecting the targeted filtering scheme according to the correspondence relationship using the keywords and user-characteristic data of the present user, and for further filtering information of the target user according to the selected filtering scheme.

In the configuration module 410, a parameter generation sub-module 412 is used for setting the keywords and user-characteristic data of information of targeted users, and generating user-characteristic parameters of a representative target user based on the set keywords and user-characteristic data. A filtering sub-module 414 is used for filtering out anomalies in the user-characteristic parameters that are generated by the parameter generation sub-module 412. A rule generation sub-module 416 is used for generating the filtering scheme for the target user based on the filtered user-characteristic parameters.

The parameter generation sub-module 412 may use various units (not shown) to perform various functions. For example, a recognition unit (not shown) may be used for recognizing valid data in the user-characteristic data; a selection unit may be used for selecting one or more sample users based on the valid data recognized by the recognition unit; and a computation unit is used for computing the user-characteristic parameters of the target user based on user-characteristic data of the one or more sample users selected by the selection unit.

The filtering sub-module 414 may use various units (not shown) to perform various functions. For example, a first filtering unit is used for replacing a missing value in the user-characteristic parameters by a replacement value; and a second filtering unit is used for replacing an irregular value in the user-characteristic parameters by a regular value.

The rule generation sub-module 416 may use various units (not shown) to perform its own related functions. For example, a parameter selection unit is used for selecting the one or more user-characteristic parameters obtained to be rule generation parameter(s); a rule computing unit is used for generating multiple filtering schemes based on the rule generation parameters selected by the parameter selection unit; and a rule selection unit is used for selecting a filtering scheme having the highest accuracy from the filtering schemes to be the filtering scheme of the target user.

In the filtering module 430, a searching sub-module 434 is used for finding the targeted filtering scheme according to the correspondence relationship using the keywords and user-characteristic data of a present user. A filtering sub-module 436 is used for filtering the target user information based on the selected filtering scheme. A determination sub-module 432 is used for storing a present user based on the targeted filtering scheme of the target user, and triggering the filtering sub-module 436 if the score of the present user exceeds a preset threshold.

In the presence disclosure, a "module" or a "unit" in general refers to a functionality designed to perform a particular task or function. A module or unit can be a device which is a tool or machine designed to perform a particular task or function. A module or unit can be a piece of hardware, software, a plan or scheme, or a combination thereof, for effectuating a purpose associated with the particular task or function. The functions of multiple modules or units may be achieved using a single device.

In particular, configuration module 410, acquisition module 420 and filtering module 430 may either be implemented in an integrated machine (a server or use of a system) or each in a separate machine (a computer or a server). In one embodiment, configuration module 410 is implemented in a first machine, and acquisition module 420 and filtering module 430 are implemented in a second machine which is connected to (but not necessarily integrated with) the first machine.

The exemplary embodiments disclosed herein may have the following advantages. Because the method establishes filtering rules of a target user to determine user activities based on specific keywords and other user related information, characteristics of user activities can be determined from multiple aspects, and processed accordingly to improve recognition accuracy with respect to a certain type of targeted users and improve the efficiency of information security.

From the exemplary embodiments described above, it is appreciated that the disclosed method and system may be implemented using software and universal hardware platform, or can be implemented using hardware only. However, in many instances, implementation using a combination of software and hardware is preferred. Based on this understanding, the technical schemes of the present disclosure, or portions contributing to existing technologies, may be implemented in the form of software products which are stored in a storage media. The software includes instructions for a computing device (e.g., a cell phone, a personal computer, a server or a networked device) to execute the method described in the exemplary embodiments of the current disclosure.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method implemented by one or more computing devices, the method comprising:
generating a plurality of filtering schemes including first multiple filtering schemes and second multiple filtering schemes, wherein:
the first multiple filtering schemes are defined using first user-characteristic parameters to target different types of users and are different from each other in using different variables for defining the first multiple filtering schemes,
the second multiple filtering schemes are defined using second user-characteristic parameters to target a same type of users, and have a same set of variables and different threshold values to provide different emphasis on respective filtering effectiveness of the second filtering schemes;
the first user-characteristic parameters and the second user-characteristic parameters are generated from one or more targeted keywords and targeted user-characteristic data extracted from a data collection of targeted users;
obtaining one or more keywords and user-characteristic data of a user;
selecting a filtering scheme from the plurality of filtering schemes based at least in part on a correspondence relationship among the filtering scheme, the one or more keywords and the user-characteristic data, wherein the correspondence relationship is determined by comparing the one or more keywords and the user-characteristic data of the user with one or more user-characteristic parameters corresponding to the selected filtering scheme; and
assigning a score to the user based at least in part on the selected filtering scheme; and
filtering information of the user according to the selected filtering scheme to prevent the user from circulating undesired information to other users in response to determining that the score of the user score exceeds a preset threshold.

2. The method as recited in claim 1, further comprising configuring the correspondence relationship, the configuring comprising:
generating one or more user-characteristic parameters of a target user of the targeted users based at least in part on the one or more targeted keywords and the targeted user-characteristic data;
filtering one or more anomalies from the one or more user-characteristic parameters of the target user;
formulating a target filtering scheme based on the one or more filtered user-characteristic parameters of the target user; and
establishing a correspondence relationship among the target filtering scheme, the one or more targeted keywords and the targeted user-characteristic data.

3. The method as recited in claim 2, wherein generating the one or more user-characteristic parameters of the target user comprises:
identifying valid data in the one or more targeted keywords and the targeted user-characteristic data;
selecting one or more sample users based on the valid data; and
obtaining the one or more user-characteristic parameters of the target user based on one or more keywords and user-characteristic data of the one or more sample users.

4. The method as recited in claim 3, wherein obtaining the one or more user-characteristic parameters of the target user comprises:
generating an aggregated variable of the target user based on a total frequency according to the one or more keywords and the user-characteristic data of the one or more sample users;
generating a ratio variable of the target user based on a send/receive ratio according to the user-characteristic data of the one or more sample users; and
generating an average variable based on an average frequency according to the one or more keywords and the user-characteristic data of the one or more sample users.

5. The method as recited in claim 2, wherein filtering the one or more anomalies from the one or more user-characteristic parameters of the target user comprises one or more of:
replacing a missing value in the one or more user-characteristic parameters of the target user by a replacement value; or
replacing an irregular data in the one or more user-characteristic parameters of the target user by a regular value.

6. The method as recited in claim 1, further comprising modeling at least one filtering scheme to filter a particular type of users, the modeling comprising:
generating one or more user-characteristic parameters of a target user of the targeted users based at least in part on the one or more targeted keywords and the targeted user-characteristic data;
selecting one or more rule generation parameters from the one or more user-characteristic parameters of the target user;
generating multiple candidate filtering schemes based on the one or more rule generation parameters; and
selecting the filtering scheme having a highest accuracy among the multiple candidate filtering schemes to be the at least one filtering scheme for the particular type of users.

7. The method as recited in claim 1, wherein the user-characteristic data of the user comprises user activity data, user information data and network user-characteristic data.

8. The method as recited in claim 7, wherein:
the user activity data includes one or more of frequencies of characteristic word groups in information sent by the user within a time frame, a number of times the user sends/receives information within the time frame, or an amount of information the user sends/receives within the time frame;
the user information data includes one or more of an initial login time of the user, user activities after login, and a number of contacts of the user; and
the network user-characteristic data includes one or more of a number of users being associated with a same IP as the user, and number of users being associated with a same machine ID as the user.

9. An apparatus comprising:
one or more processors;
memory;
a configuration module stored in the memory and executable by the one or more processors to generate a plurality of filtering schemes comprise first multiple filtering schemes and second multiple filtering schemes,
the plurality of filtering schemes including first multiple filtering schemes and second multiple filtering schemes, the first multiple filtering schemes being defined using first-user-characteristic parameters to target different types of users and are different from each other in using different variables for defining the first multiple filtering schemes, the second multiple filtering schemes being defined using second user-characteristic parameters to target a same type of users, and have a same set of variables and different threshold values to provide different emphasis on respective filtering effectiveness of the second filtering schemes, and the first user-characteristic parameters and the second user-characteristic parameters are generated from one or more targeted keywords and targeted user-characteristic data extracted from a data collection of targeted users;

an acquisition module stored in the memory and executable by the one or more processors to obtain one or more keywords and user-characteristic data of a user; and a filtering module stored in the memory and executable by the one or more processors to:

select a filtering scheme from the plurality of filtering schemes according to a correspondence relationship based at least in part on the one or more keywords and the user-characteristic data of the user, the correspondence relationship being determined by comparing the one or more keywords and the user-characteristic data of the user with one or more user-characteristic parameters corresponding to the selected filtering scheme, assign a score to the user based at least in part on the selected filtering scheme, and filter information of the user according to the selected filtering scheme to prevent the user from circulating undesired information to other users in response to determining that the score of the user score exceeds a preset threshold.

10. The apparatus as recited in claim 9, wherein the configuration module comprises:

a parameter generation sub-module used for extracting the one or more targeted keywords and the targeted user-characteristic data from the data collection of targeted users, and for generating one or more user-characteristic parameters of a target user based at least in part on the one or more targeted keywords and the targeted user-characteristic data;

a filtering sub-module used for filtering one or more anomalies from the one or more user-characteristic parameters of the target user generated by the parameter generation sub-module; and a rule generation sub-module used for generating a targeted filtering scheme for the target user based at least in part on the one or more filtered user-characteristic parameters.

11. The apparatus as recited in claim 10, wherein the parameter generation sub-module comprises:

a recognition unit used for recognizing valid data in the targeted user-characteristic data;

a selection unit used for selecting one or more sample users based on the valid data; and a computation unit used for computing the one or more user-characteristic parameters of the target user based on user-characteristic data of the one or more sample users selected by the selection unit.

12. The apparatus as recited in claim 10, wherein the filtering sub-module comprises:

a first filtering unit used for replacing a missing value in the one or more user-characteristic parameters of the target user by a replacement value; and a second filtering unit used for replacing an irregular value in the one or more user-characteristic parameters of the target user by a regular value.

13. The apparatus as recited in claim 10, wherein the rule generation sub-module comprises:

a parameter selection unit used for selecting one or more rule generation parameters;

a rule computing unit used for generating multiple candidate filtering schemes based at least in part on the one or more rule generation parameters selected by the parameter selection unit; and a rule selection unit used for selecting a filtering scheme having a highest accuracy among the multiple candidate filtering schemes to be the targeted filtering scheme of the target user.

14. One or more non-transitory storage media storing executable instructions that, when executed by one or more processors, cause the one or more processors to perform acts comprising:

generating a plurality of filtering schemes including first multiple filtering schemes and second multiple filtering schemes, wherein:

the first multiple filtering schemes are defined using first user-characteristic parameters to target different types of users and are different from each other in using different variables for defining the first multiple filtering schemes, the second multiple filtering schemes are defined using second user-characteristic parameters to target a same type of users, and have a same set of variables and different threshold values to provide different emphasis on respective filtering effectiveness of the second filtering schemes; and the first user-characteristic parameters and the second user-characteristic parameters are generated from one or more targeted keywords and targeted user-characteristic data extracted from a data collection of targeted users;

obtaining one or more keywords and user-characteristic data of a user;

selecting a filtering scheme from the plurality of filtering schemes based at least in part on a correspondence relationship among the filtering scheme, the one or more keywords and the user-characteristic data, wherein the correspondence relationship is determined by comparing the one or more keywords and the user-characteristic data of the user with one or more user-characteristic parameters corresponding to the selected filtering scheme; and assigning a score to the user based at least in part on the selected filtering scheme; and filtering information of the user according to the selected filtering scheme to prevent the user from circulating undesired information to other users in response to determining that the score of the user score exceeds a preset threshold.

15. The one or more storage media as recited in claim 14, the acts further comprising configuring the correspondence relationship, the configuring comprising:

generating one or more user-characteristic parameters of a target user of the targeted users based at least in part on the one or more targeted keywords and the targeted user-characteristic data;

filtering one or more anomalies from the one or more user-characteristic parameters of the target user;

formulating a target filtering scheme based on the one or more filtered user-characteristic parameters of the target user; and establishing a correspondence relationship among the target filtering scheme, the one or more targeted keywords and the targeted user-characteristic data.

16. The one or more storage media as recited in claim 15, wherein generating the one or more user-characteristic parameters of the target user comprises:

identifying valid data in the one or more targeted keywords and the targeted user-characteristic data;

selecting one or more sample users based on the valid data; and obtaining the one or more user-characteristic parameters of the target user based on one or more keywords and user-characteristic data of the one or more sample users.

17. The one or more storage media as recited in claim 16, wherein obtaining the one or more user-characteristic parameters of the target user comprises:

generating an aggregated variable of the target user based on a total frequency according to the one or more keywords and the user-characteristic data of the one or more sample users;

generating a ratio variable of the target user based on a send/receive ratio according to the user-characteristic data of the one or more sample users; and generating an average variable based on an average frequency according to the one or more keywords and the user-characteristic data of the one or more sample users.

18. The one or more storage media as recited in claim 15, wherein filtering the one or more anomalies from the one or more user-characteristic parameters of the target user comprises one or more of:

replacing a missing value in the one or more user-characteristic parameters of the target user by a replacement value; or replacing an irregular data in the one or more user-characteristic parameters of the target user by a regular value.

19. The one or more storage media as recited in claim 14, the acts further comprising modeling at least one filtering scheme to filter a particular type of users, the modeling comprising:

generating one or more user-characteristic parameters of a target user of the targeted users based at least in part on the one or more targeted keywords and the targeted user-characteristic data;

selecting one or more rule generation parameters from the one or more user-characteristic parameters of the target user;

generating multiple candidate filtering schemes based on the one or more rule generation parameters; and selecting the filtering scheme having a highest accuracy among the multiple candidate filtering schemes to be the at least one filtering scheme for the particular type of users.

20. The one or more storage media as recited in claim 14, wherein the user-characteristic data of the user comprises user activity data, user information data and network user-characteristic data.

* * * * *